(12) United States Patent
Kim et al.

(10) Patent No.: US 9,167,059 B2
(45) Date of Patent: Oct. 20, 2015

(54) MOBILE TERMINAL AND CONTROL METHOD THEREOF

(71) Applicants: Hyunjin Kim, Seoul (KR); Cheegoog Kim, Daegu (KR)

(72) Inventors: Hyunjin Kim, Seoul (KR); Cheegoog Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 248 days.

(21) Appl. No.: 13/735,768

(22) Filed: Jan. 7, 2013

(65) Prior Publication Data

US 2013/0344919 A1    Dec. 26, 2013

(30) Foreign Application Priority Data

Jun. 26, 2012 (KR) ......................... 10-2012-0068744

(51) Int. Cl.

| | |
|---|---|
| *H04M 1/66* | (2006.01) |
| *G06F 3/033* | (2013.01) |
| *H04M 1/02* | (2006.01) |
| *G06F 1/16* | (2006.01) |
| *G06F 3/042* | (2006.01) |

(52) U.S. Cl.
CPC ........... *H04M 1/0202* (2013.01); *G06F 1/1626* (2013.01); *G06F 1/1643* (2013.01); *G06F 1/1656* (2013.01); *G06F 3/042* (2013.01); *G06F 2200/1636* (2013.01)

(58) Field of Classification Search
CPC .......................... H04M 1/0281; H04M 1/0266
USPC ................................................ 455/575.1, 566
See application file for complete search history.

(56) References Cited

U.S. PATENT DOCUMENTS

| | | | |
|---|---|---|---|
| 6,625,283 B1 * | 9/2003 | Sato .......................... 379/433.07 |
| 8,493,342 B2 * | 7/2013 | Park et al. ...................... 345/173 |
| 8,502,800 B1 * | 8/2013 | Vier ............................... 345/174 |
| 8,831,688 B2 * | 9/2014 | Lee et al. ....................... 455/566 |
| 2010/0306718 A1 * | 12/2010 | Shim et al. .................... 715/863 |
| 2011/0141142 A1 * | 6/2011 | Leffert et al. ................. 345/659 |
| 2011/0237220 A1 * | 9/2011 | Matsuoka ..................... 455/411 |

* cited by examiner

*Primary Examiner* — Blane J Jackson
(74) *Attorney, Agent, or Firm* — KED & Associates LLP

(57) ABSTRACT

A mobile terminal may be provided that includes a squeeze sensor disposed at a lateral surface of a housing to sense a pressure greater than a predetermined value being applied thereto; and a controller configured to change the location of an object displayed on a display based on a pressure applied position when the sensed pressure is greater than a predetermined value.

20 Claims, 15 Drawing Sheets

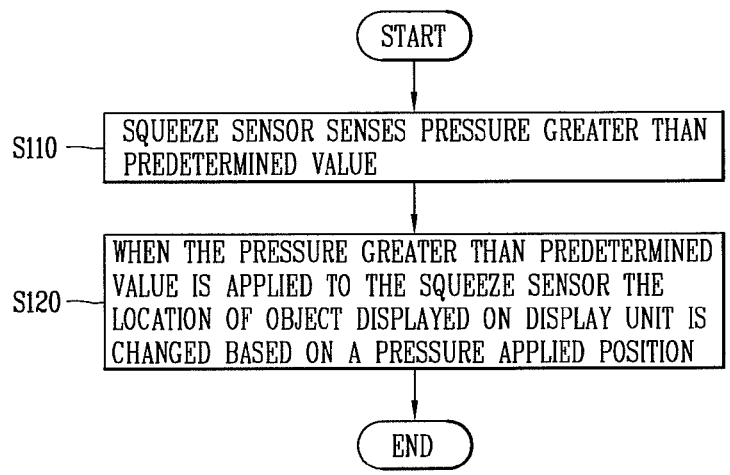
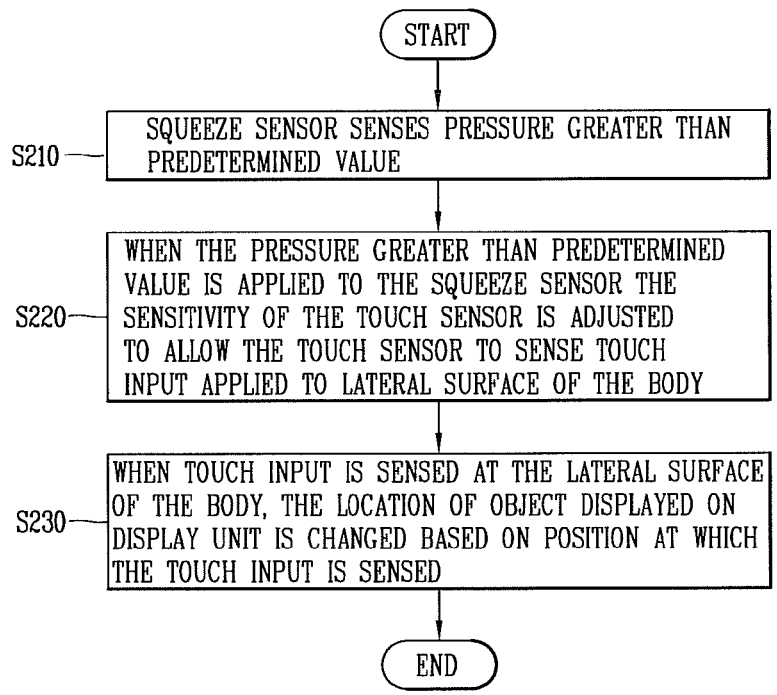

FIG. 6
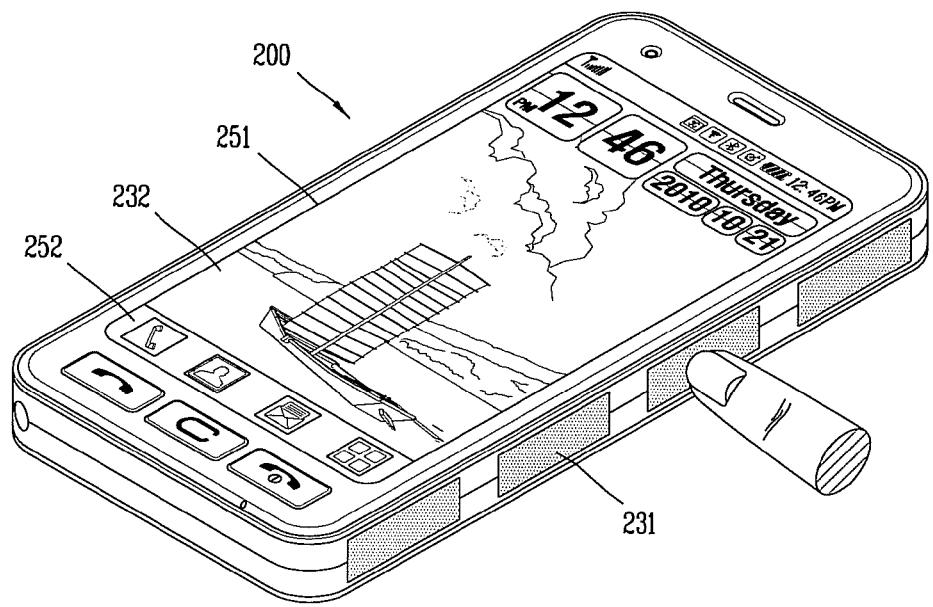
CHANGE OBJECT LOCATION
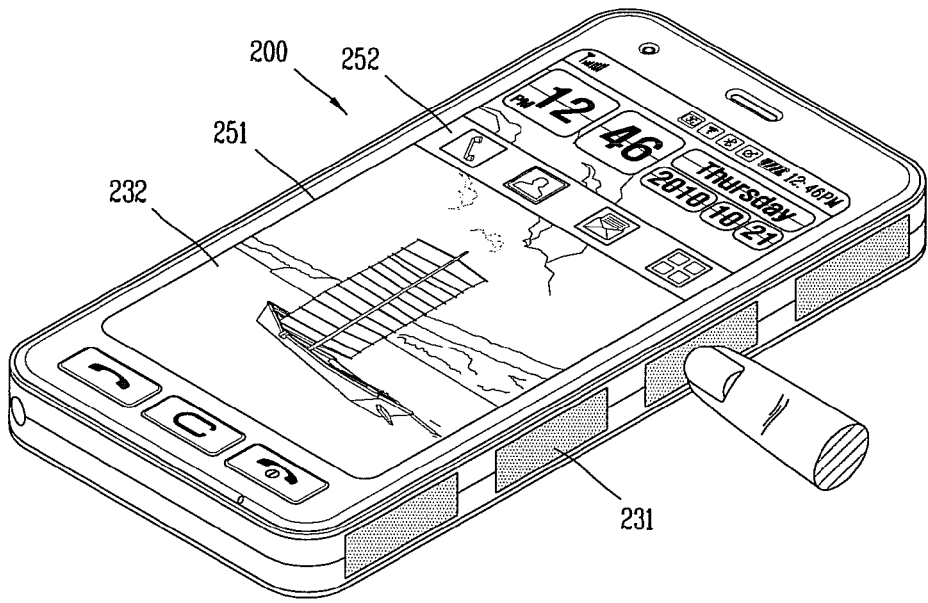

FIG. 15
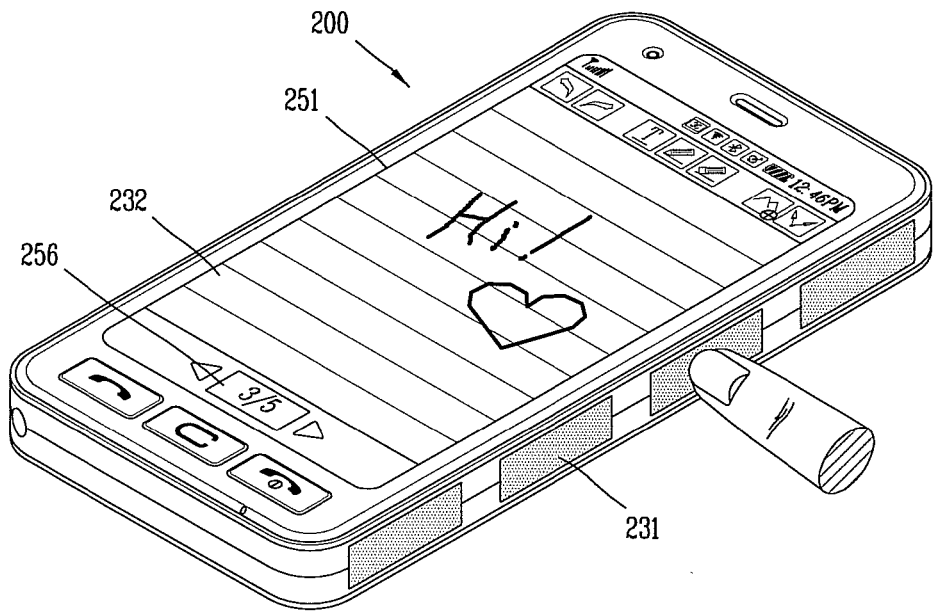
TURN OVER PAGE
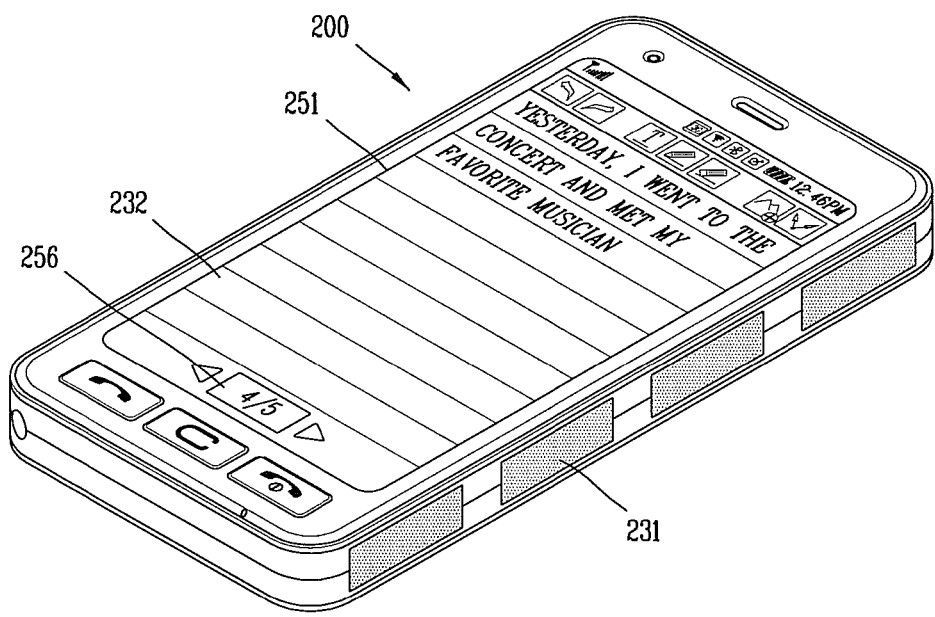

FIG. 16
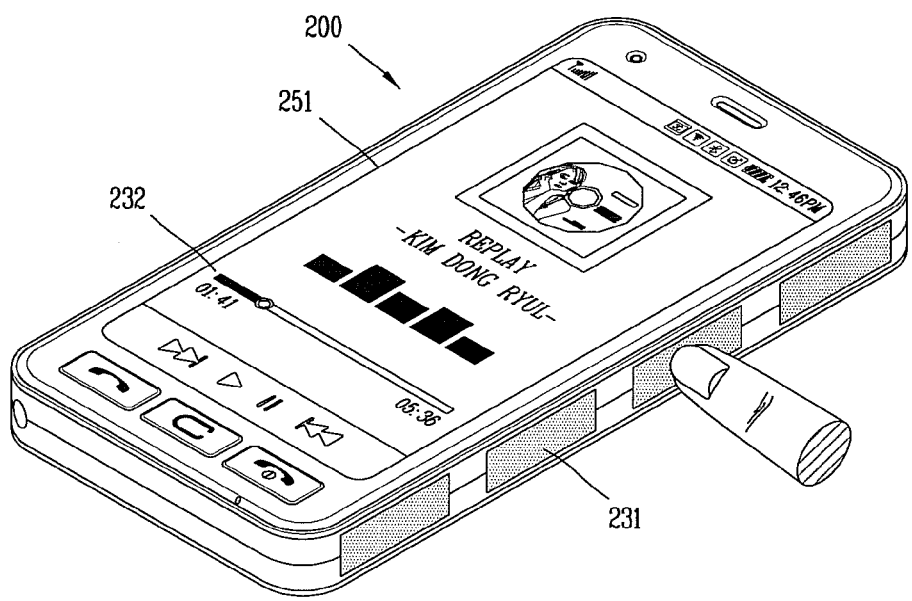
CHANGE TO ANOTHER CONTENTS
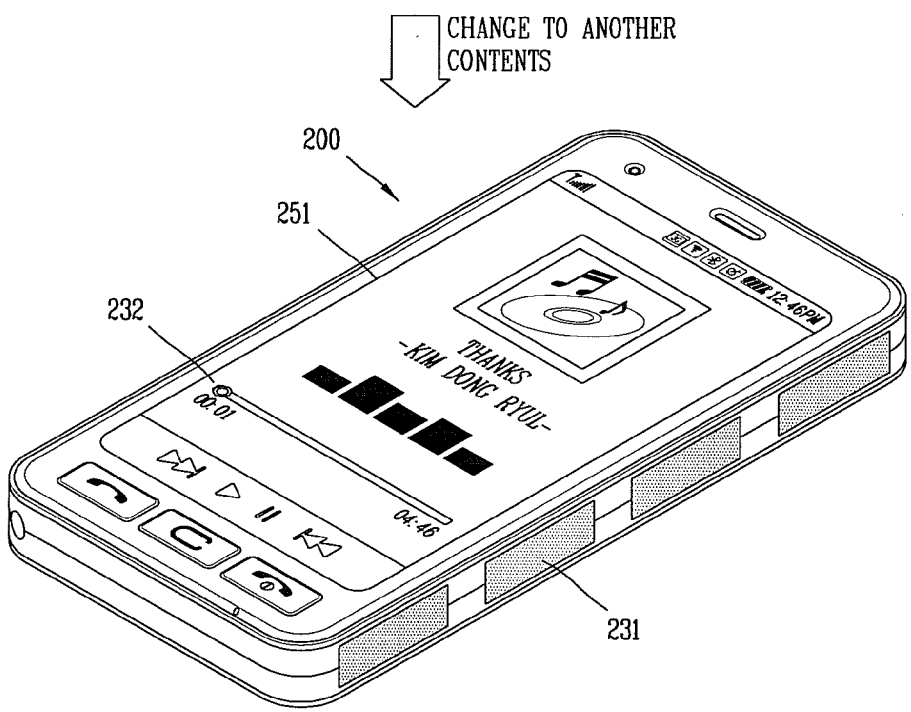

MOBILE TERMINAL AND CONTROL METHOD THEREOF

CROSS-REFERENCE TO RELATED APPLICATION

This application claims priority to Korean Application No. 10-2012-0068744, filed Jun. 26, 2012, the subject matter of which is incorporated herein by reference.

BACKGROUND

1. Field

The present disclosure may relate to a mobile terminal having a squeeze sensor.

2. Background

Terminals may be classified as mobile (or portable) terminals and stationary terminals based on its mobility. The mobile terminals may be further classified as handheld terminals and vehicle mount terminals based on whether (or not) the terminal can be directly carried by a user.

A terminal may be allowed to capture still images or moving images, play music or video files, play games, receive broadcast and the like, so as to be implemented as an integrated multimedia player. Improvement of structural or software elements of the terminal may be taken into consideration to support and enhance functions of the terminal.

A user may generate an input signal using a touch sensor provided on a display unit of the terminal. However, the touch sensor may be activated only when the display unit is activated, and thus the touch sensor has a limit in generating various input signals.

BRIEF DESCRIPTION OF THE DRAWINGS

Arrangements and embodiments may be described in detail with reference to the following drawings in which like reference numerals refer to like elements and wherein:

FIGS. 4 and 5 are flow charts for explaining a method of a mobile terminal according to an example embodiment of the present disclosure; and FIGS. 6 through 16 are views illustrating an operation example of the mobile terminal.

DETAILED DESCRIPTION

Figure 1:
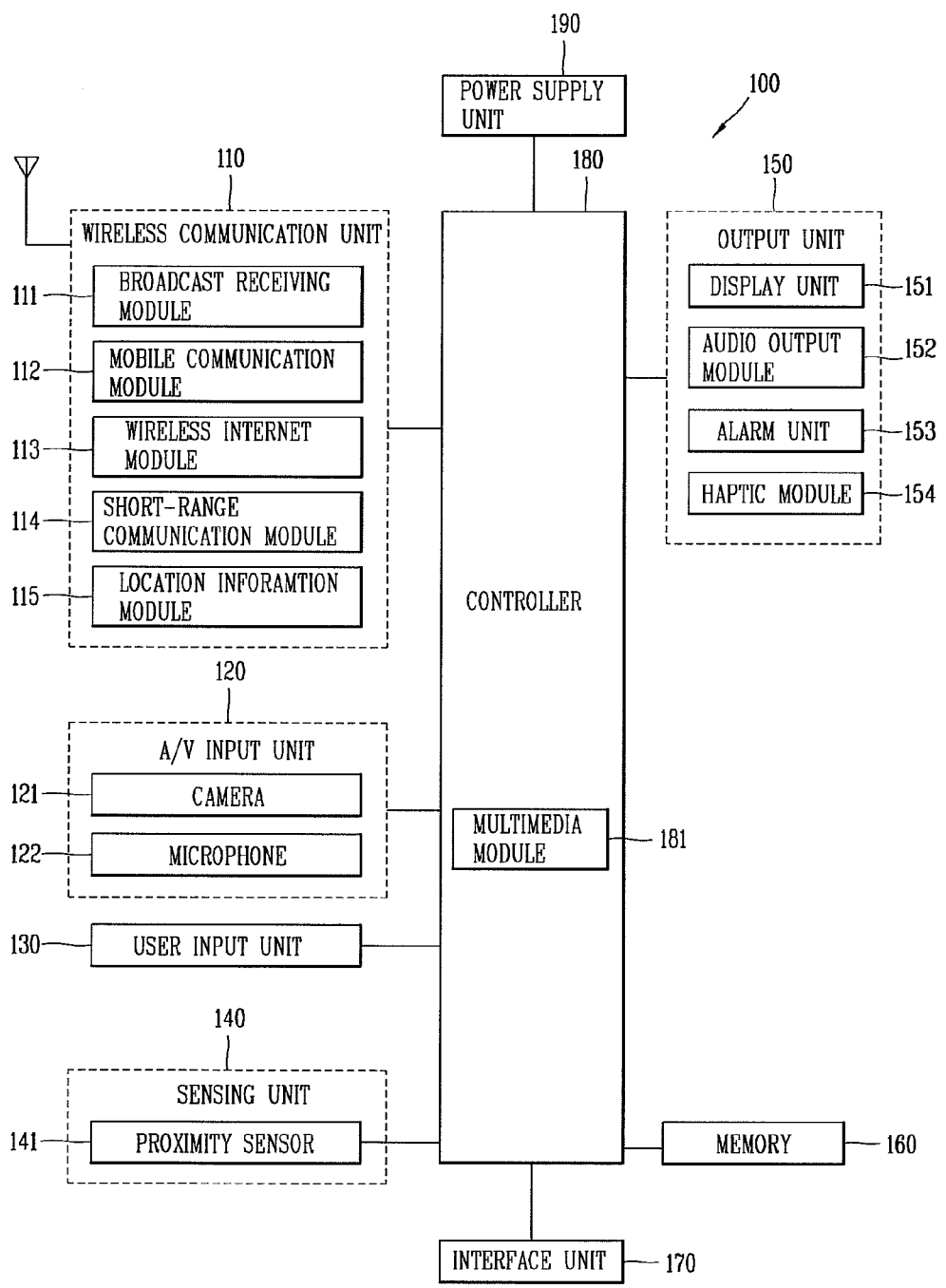
FIG. 1 is a block diagram illustrating a mobile terminal.

FIG. 1 is a block diagram illustrating a mobile terminal according to an example arrangement. Other arrangements may also be provided.

FIG. 1 shows that a mobile terminal 100 may include a wireless communication unit 110, an audio/video (NV) input unit 120, a user input unit 130, a sensing unit 140, an output unit 150, a memory 160, an interface unit 170, a controller 180, a power supply unit 190, and the like. However, constituent elements as shown in FIG. 1 are not necessarily required, and the mobile terminal 100 may be implemented with greater or less number of elements than those illustrated elements.

The wireless communication unit 110 may include one or more elements allowing radio communication between the mobile terminal 100 and a wireless communication system, or allowing wireless (or radio) communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and/or the like.

The broadcast receiving module 111 may receive broadcast signals and/or broadcast associated information from an external broadcast management server through a broadcast channel. The broadcast associated information may be information regarding a broadcast channel, a broadcast program, a broadcast service provider, and/or the like. The broadcast associated information may also be provided through a mobile communication network. The broadcast associated information may be received by the mobile communication module 112. The broadcast signal and broadcast-associated information received through the broadcast receiving module 111 may be stored in the memory 160.

The mobile communication module 112 may transmit and/or receive a radio signal to and/or from at least one of a base station, an external terminal and/or a server over a mobile communication network. The radio signal may include a voice call signal, a video call signal or various types of data according to text and/or multimedia message transmission and reception.

The wireless Internet module 113 may be a module for supporting wireless Internet access and may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and/or the like.

The short-range communication module 114 may be a module for supporting a short-range communication. A variety of short-range communication technologies may be used, such as Bluetooth, Radio Frequency IDentification (RFID), Infrared Data Association (IrDA), Ultra WideBand (UWB), ZigBee, and/or the like.

The location information module 115 may be a module for acquiring a location (or position) of the mobile terminal 100. A GPS module may be an example of the location information module 115.

The A/V (audio/video) input unit 120 may receive an audio or video signal, and the A/V (audio/video) input unit 120 may include a camera 121, a microphone 122, and the like. The camera 121 may process an image frame, such as still or moving images, obtained by an image sensor in a video phone call or an image capturing mode. The processed image frame may be displayed on a display unit 151 (or display). The image frames processed by the camera 121 may be stored in the memory 160 or may be transmitted to an external device through the wireless communication unit 110. Two or more cameras 121 may be provided according to a use environment of the mobile terminal 100.

The microphone 122 may receive an external audio signal through a microphone in a phone call mode, a recording mode, a voice recognition mode, and the like, and the microphone 122 may process the audio signal into electrical voice data. The processed voice data may be converted and outputted in a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and/or the like.

The sensing unit 140 may detect presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like. The sensing unit 140 may generate a sensing signal for controlling operation of the mobile terminal 100. For example, when the mobile terminal 100 is a slide phone type, the sensing unit 140 may sense an opened or closed configuration of the slide phone. The sensing unit 140 may sense whether (or not) power is supplied from the power supply unit 190, or whether (or not) an external device is coupled to the interface unit 170.

The sensing unit 140 may include a proximity sensor 141. The sensing unit 140 may include a touch sensor for sensing a touch operation with respect to the display unit 151. Other sensors may also be used.

The touch sensor may be implemented as a touch film, a touch sheet, a touch pad, and/or the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and the display unit 151 form an interlayer structure, the display unit 151 may be used as an input device (rather than an output device). The display unit 151 may be referred to as a touch screen.

When there is a touch input through the touch screen, the corresponding signals may be transmitted to a touch controller. The touch controller may process signals transferred from the touch sensor, and then transmit data corresponding to the processed signals to the controller 180. The controller 180 may sense which region of the display unit 151 has been touched.

When the touch screen is a capacitance type, a proximity of a sensing object may be detected by changes of an electromagnetic field according to proximity of a sensing object. The touch screen may be categorized as a proximity sensor 141.

The proximity sensor 141 may be a sensor for detecting presence or absence of a sensing object using an electromagnetic field or infrared rays without a mechanical contact. The proximity sensor 141 may have a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and/or the like.

Hereinafter, for ease of explanation, a behavior of closely approaching the touch screen without contact may be referred to as a proximity touch, whereas a behavior of substantially coming in contact with the touch screen may be referred to as a contact touch.

The proximity sensor 141 may sense proximity touch, and proximity touch patterns (e.g., distance, direction, speed, time, position, moving status, etc.). Information relating to the sensed proximity touch and the sensed proximity touch patterns may be output on the touch screen.

The output unit 150 may generate an output related to visual, auditory, tactile senses. The output unit 150 may include the display unit 151 (or display), an audio output module 152, an alarm unit 153 (or alarm), a haptic module 154, and/or the like.

The display unit 151 may display (output) information processed in the mobile terminal 100. For example, when the mobile terminal 100 is operated in a phone call mode, the display unit 151 may display a user interface (UI) or graphic user interface (GUI) related to a phone call. When the mobile terminal 100 is operated in a video call mode or an image capturing mode, the display unit 151 may display a captured image, a received image, UI, GUI, and/or the like.

The display unit 151 may include at least one of a liquid crystal display (LCD), a thin film transistor-liquid crystal display (TFT-LCD), an organic light emitting diode (OLED) display, a flexible display, a 3-dimensional (3D) display, and/or an e-ink display.

At least one of those displays (or display devices) included in the display unit 151 may be configured with a transparent or optical transparent type to allow the user to view the outside therethrough. It may be referred to as a transparent display. An example of the transparent display may be a transparent OLED (TOLED), and/or the like. Under this configuration, the user may view an object positioned at a rear side of the mobile device body through a region occupied by the display unit 151 of the mobile device body.

Two or more display units 151 may be provided according to implementation of the mobile terminal 100. For example, a plurality of the display units 151 may be provided on one surface in a separate or integrated manner, or may be provided on different surfaces, respectively.

The audio output module 152 may output audio data received from the wireless communication unit 110 or stored in the memory 160, in a call-receiving mode, a call-placing mode, a recording mode, a voice selection mode, a broadcast reception mode, and/or the like. The audio output module 152 may output an audio signal related to a function carried out in the mobile terminal 100 (e.g. sound alarming a call received or a message received, and the like). The audio output module 152 may include a receiver, a speaker, a buzzer, and/or the like.

The alarm unit 153 may output signals notifying occurrence of an event from the mobile terminal 100. The examples of an event occurring from the mobile terminal 100 may include a call received, a message received, a key signal input, a touch input, and/or the like. The alarm unit 153 may output not only video or audio signals, but also other types of signals such as signals for notifying the occurrence of an event in a vibration manner. Since the video or audio signals may also be output through the display unit 151 or the audio output unit 152, the display unit 151 and the audio output module 152 may be categorized as part of the alarm unit 153.

The haptic module 154 may generate various tactile effects that can be felt by the user. A representative example of the tactile effects generated by the haptic module 155 may include vibration. Vibration generated by the haptic module 155 may have a controllable intensity, a controllable pattern, and/or the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and/or the like.

The haptic module 154 may transmit tactile effects through the user's direct contact, or the user's muscular sense using a finger or a hand. Two or more haptic modules 154 may be provided according to configuration of the mobile terminal 100.

The memory 160 may store a program for operating the controller 180, or may temporarily store input/output data (e.g. phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. The mobile terminal 100 may operate a web storage that performs the storage function of the memory 160 on the Internet.

The interface unit 170 (or interface) may interface the mobile terminal 100 with external devices. The interface unit 170 may allow a data reception from an external device, a power delivery to each component in the mobile terminal 100, or a data transmission from the mobile terminal 100 to an external device. The interface unit 170 may include wired/wireless headset ports, external charger ports, wired/wireless data ports, memory card ports, ports for coupling devices having an identification module, audio Input/Output (I/O) ports, video I/O ports, earphone ports, and/or the like, for example.

The identification module may be a chip for storing various information required to authenticate an authority to use the mobile terminal 100, which may include a User Identity Module (UIM), a Subscriber Identity Module (SIM), and the like. The device having the identification module (hereafter also referred to as an identification device) may be implemented in a type of smart card. The identification device may be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 may control overall operations of the mobile terminal 100. For example, the controller 180 may perform the control and processing related to telephony calls, data communications, video calls, and/or the like. The controller 180 may include a multimedia module 181 that provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 (or power supply) may receive external or internal power to provide power required by various components under control of the controller 180.

Various embodiments described herein may be implemented in a computer or similar device readable medium using software, hardware, or any combination thereof.

For hardware implementation, embodiments may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. Such embodiments may be implemented in the controller 180 itself.

For software implementation, embodiments such as procedures or functions may be implemented together with separate software modules that allow performing of at least one function or operation. Software codes may be implemented by a software application written in any suitable programming language. The software codes may be stored in the memory 160 and executed by the controller 180.

The method of processing a user input to the mobile terminal 100 may now be described.

The user input unit 130 may be manipulated to receive a command for controlling operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and/or the like. For an input of the visual information, at least one of a character, a numeral, a symbol, a graphic, and an icon may be displayed with a predetermined arrangement so as to be implemented in the form of a keypad. Such a keypad may be referred to as a soft key.

The display unit 151 may operate on an entire region or may operate by being separated into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window may be attempted or a text displayed on the output window may be entered to the application.

The display unit 151 or touch pad may be configured to sense a touch scroll. The user may move an object displayed on the display unit 151, for example, a cursor or pointer provided on an icon or the like, by scrolling the display unit 151 or touch pad. When a finger is moved on the display unit 151 or a touch pad, a path being moved by the finger may be visually displayed on the display unit 151. It may be useful to edit an image displayed on the display unit 151.

In order to cope with an example where the display unit 151 and the touch pad are touched together within a predetermined period of time, one function of the terminal 100 may be implemented. For the example of being touched together, this is an example when the user clamps a body of the mobile terminal 100 using his or her thumb and forefinger. For one of the above functions implemented in the mobile terminal 100, for example, there may be an activation or de-activation for the display unit 151 or the touch pad.

Figure 2A:
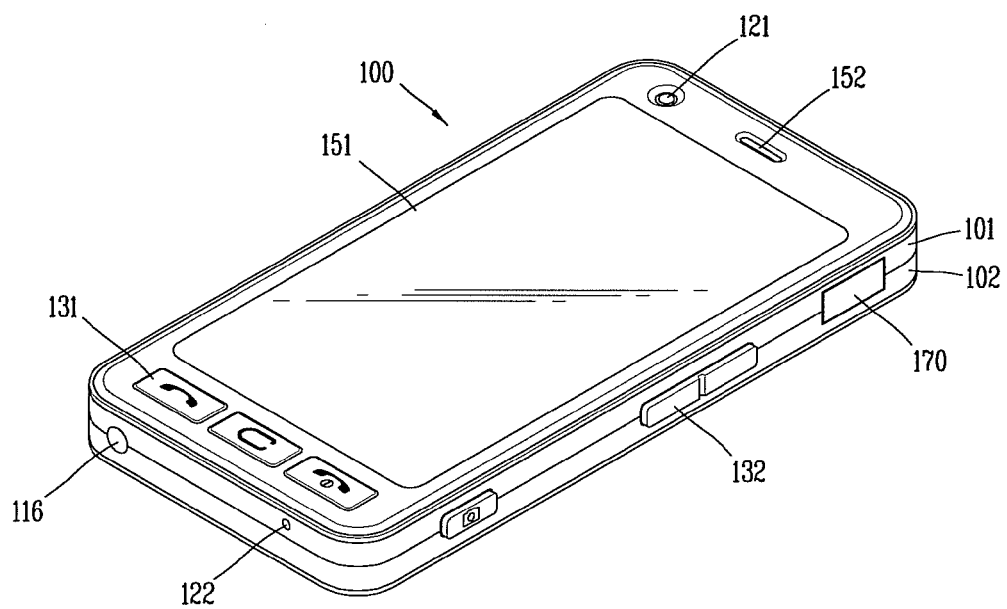
FIGS. 2A and 2B are perspective views illustrating an external appearance of the mobile terminal.
Figure 2B:
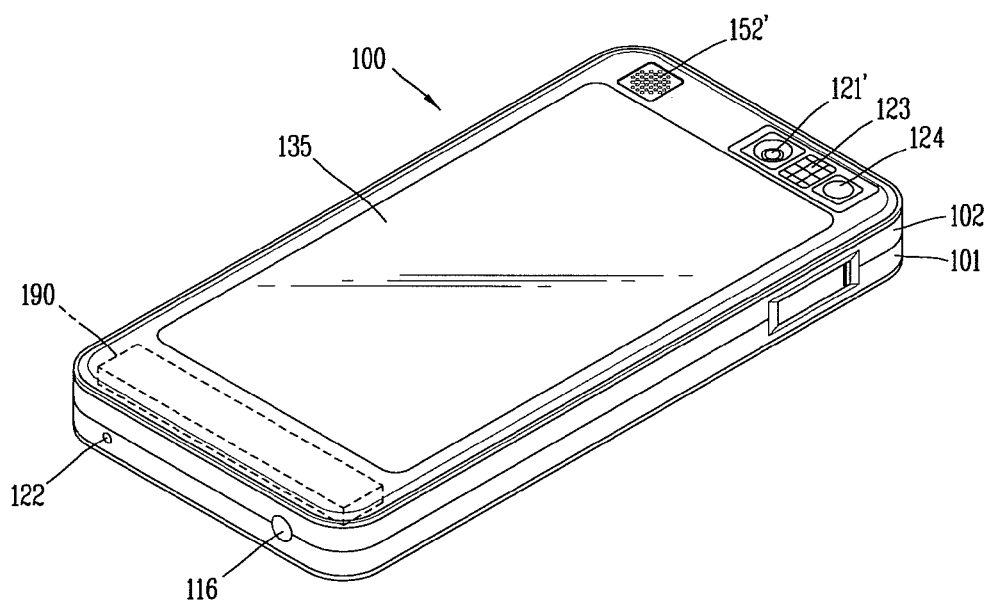

FIGS. 2A and 2B are perspective views illustrating an external appearance of a mobile terminal 100. FIG. 2A is a front and a side view illustrating the mobile terminal 100. FIG. 2B is a rear and other side view illustrating the mobile terminal 100. Other arrangements and views may also be provided.

Referring to FIG. 2A, the mobile terminal 100 may be provided with a bar-type terminal body. However, embodiments are not only limited to this type of terminal, but are also applicable to various structures of terminals such as a slide type, a folder type, a swivel type, a swing type, and the like, in which two and more bodies are combined with each other in a relatively movable manner.

The terminal body may include a case (casing, housing, cover, etc.) forming an appearance of the terminal. The case or housing may be separated into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

The display unit 151, the audio output module 152, the camera 121, the user input unit 130, the microphone 122, the interface unit 170, and the like may be arranged on (or at) the terminal body, mainly at or on the front case 101.

The display unit 151 may occupy most of the front case 101. The audio output unit 152 and the camera 121 may be disposed on a region adjacent to one of both ends of the display unit 151, and the user input unit 131 and the microphone 122 are disposed at or on a region adjacent to the other end thereof. The user interface 132 and the interface 170, and/or the like, may be disposed on a lateral surface of the front case 101 and the rear case 102.

The user input unit 130 is manipulated to receive a command for controlling the operation of the mobile terminal 100. The user input unit 130 may include a plurality of manipulation units 131, 132.

The manipulation units 131, 132 may receive various commands. For example, the first manipulation unit 131 may be used to receive a command, such as start, end, scroll, and/or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted at or on a rear surface of the terminal body, namely the rear case 102. The rear camera 121' may have an image capturing direction, which is substantially opposite to the direction of the front camera 121, and may have a different number of pixels from those of the front camera 121.

For example, the front camera 121 may be configured to have a relatively small number of pixels, and the rear camera 121' may be configured to have a relatively large number of pixels. Accordingly, in an example where the front camera 121 is used for video communication, it may be possible to reduce a size of transmission data when the user captures his or her own face and sends it to the other party in real time. On the other hand, the rear camera 121' may be used for the purpose of storing high quality images.

The cameras 121, 121' may be provided in the terminal body in a rotatable and pop-upable manner.

A flash 123 and a mirror 124 may be additionally disposed adjacent to the rear camera 121'. The flash 123 may illuminate light toward an object when capturing the object with the camera 121'. The mirror 124 may allow the user to look at his or her own face, or the like, in a reflected way when capturing himself or herself (in a self-portrait mode) by using the rear camera 121'.

A rear audio output unit 152' may be additionally disposed at or on a rear surface of the terminal body. The rear audio output unit 152' together with the front audio output unit 152 may implement a stereo function, and it may be also used to implement a speaker phone mode during a phone call.

An antenna 116 for receiving broadcast signals may be additionally disposed at or on a lateral surface of the terminal body. The antenna 116 constituting part of a broadcast receiving module 111 may be provided so as to be pulled out from the terminal body.

A power supply unit 190 (or power supply) for supplying power to the mobile terminal 100 may be mounted at or on the terminal body. The power supply unit 190 may be configured so as to be incorporated in the terminal body, or may be directly detachable from the outside of the terminal body.

A touch pad 135 for detecting a touch may be additionally mounted at or on the rear case 102. The touch pad 135 may be also configured with an optical transmission type, similar to the display unit 151. Alternatively, a rear display unit for displaying visual information may be additionally mounted at or on the touch pad 135. Information displayed on the both surfaces of the front display unit 151 and rear display unit may be controlled by the touch pad 135.

The touch pad 135 may operate in conjunction with the display unit 151 of the front case 101. The touch pad 135 may be disposed in parallel at a rear side of the display unit 151. The touch pad 135 may have a same size as or a smaller size than the display unit 151.

The user may generate an input signal using a touch sensor provided at the display unit 151 of the mobile terminal 100. However, the mobile terminal 100 may activate the touch sensor only when the display unit 151 is activated, and there is a limit in generating various input signals.

A mobile terminal capable of generating an input signal using various devices and a control method thereof may be described with reference to the accompanying drawings.

Figure 3A:
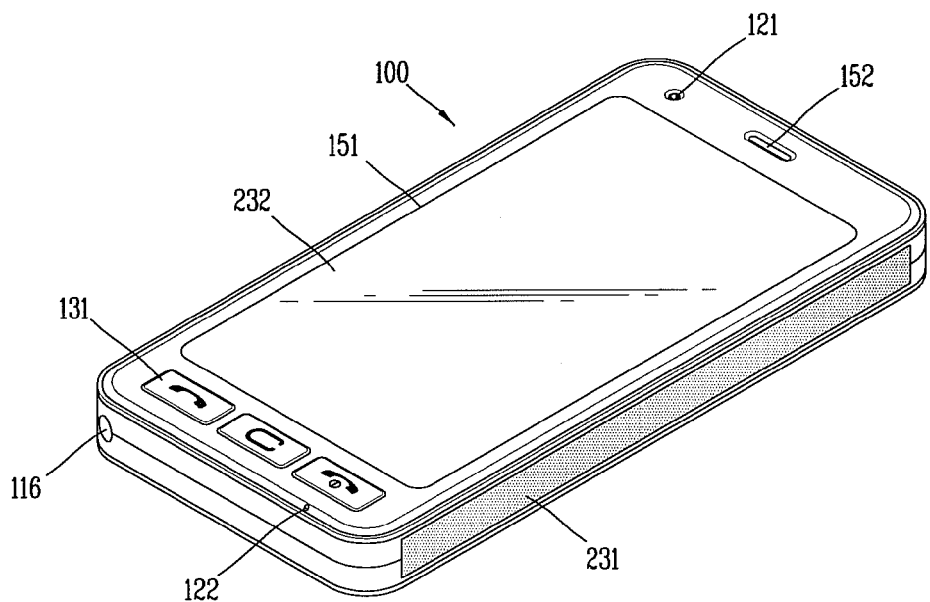
FIGS. 3A and 3B are perspective views illustrating an external appearance of the mobile terminal.
Figure 3B:
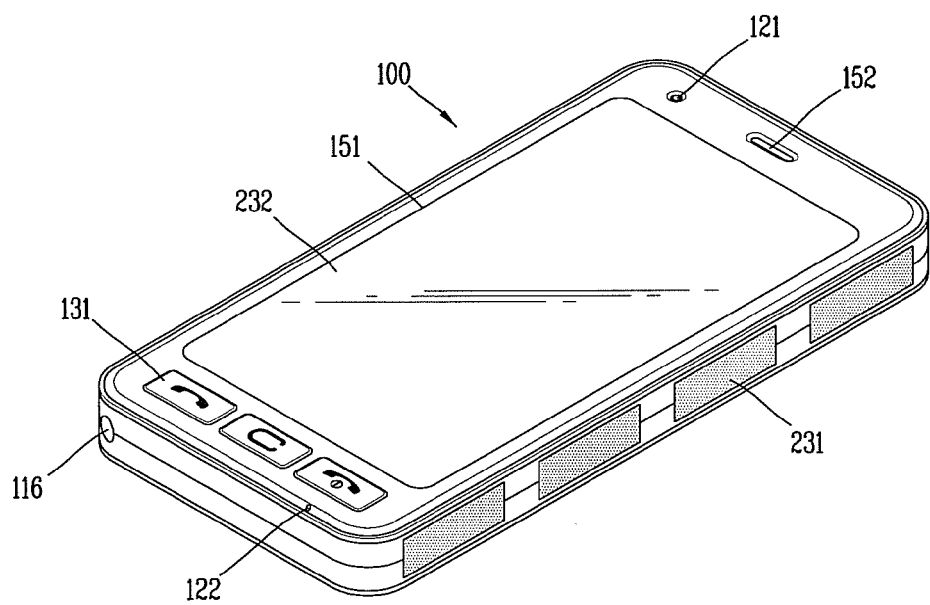

FIGS. 3A and 3B are perspective views illustrating an external appearance of the mobile terminal 100 according to the present disclosure. A front surface and a lateral surface of the mobile terminal 100 are shown in FIGS. 3A and 3B. Other embodiments and views may also be provided.

The mobile terminal 100 may include the display unit 151 and the user interface 130. The user interface 130 may include a squeeze sensor 231 (or sensor) and a touch sensor 232.

The display unit 151 may occupy most of the front case 101. The audio output unit 152 and the camera 121 may be located in a region adjacent to one end portion of the display unit 151. The user interface 130 and the microphone 122 may be located in a region adjacent to the other end portion of the display unit 151.

Referring to FIGS. 3A and 3B, the touch sensor 232 may be disposed at a front surface of the display unit 151, and may be formed to sense a touch input. The squeeze sensor 231 may be disposed at a lateral surface of the body or housing, and may be formed by a pressure that is greater than a predetermined value being applied thereto. The pressure greater than the predetermined value may be an activation pressure.

More specifically, referring to FIG. 3A, the squeeze sensor 231 may be located at a lateral surface of the front case 101 and the rear case 102 (or the lateral side of the housing). The squeeze sensor 231 may be located at the other lateral surface of the front case 101 and the rear case 102. In other words, the squeeze sensor 231 may be located at two lateral surfaces of the front case 101 and the rear case 102, or the squeeze sensor 231 may be located at all four lateral surfaces thereof.

Referring to FIG. 3B, the squeeze sensor 231 may include a plurality of squeeze sensors. The plurality of squeeze sensors may be located at a lateral surface of the front case 101 and the rear case 102 (i.e., a lateral side of the housing).

Accordingly, when a pressure is applied to the squeeze sensor 231 by a user's left hand or a user's right hand, the controller 180 may detect (or determine) a pressure generated according to a location at which each finger is placed. The squeeze sensor 231 may detect (or determine) a squeeze state that is generated by fingers applying pressures above a predetermined value (i.e., above the activation pressure).

The mobile terminal 100 may distinguish a grip state and a squeeze state based on a size (or amount) of a pressure applied to the squeeze sensor unit 231. For example, when a pressure that is less than a predetermined value is applied to the squeeze sensor 231, it may be referred to as a grip state. When a pressure greater than a predetermined value is applied to the squeeze sensor 231, it may be referred to as a squeeze state. The controller 180 may perform a control operation according to an input applied to the squeeze sensor 231 in a squeeze state.

FIGS. 4 and 5 are flow charts of a method of a mobile terminal 100 according to an example embodiment. Other embodiments and operations may also be provided. Embodiments may be described with respect to a mobile terminal 200, which includes components of the mobile terminal 100.

The mobile terminal 200 may include a display unit 251 (corresponding to the display unit 151), the squeeze sensor 231, the touch sensor 232, and the controller 180.

Referring to FIG. 4, a pressure greater than a predetermined value may be applied to the squeeze sensor 231 (S110).

The main body or housing may include a front surface, a rear surface and a lateral surface. The display unit 251 may be disposed at the front surface of the body to display an object.

The squeeze sensor 231 may include at least one squeeze sensor. The squeeze sensor 231 may be disposed at the lateral surface of the body (or housing). The squeeze sensor 231 may be disposed only at the lateral surface of the body (or housing), and/or may be disposed at all lateral surfaces of the body (or housing). The squeeze sensor 231 may be disposed a first lateral surface and a second lateral surface that cross each other, respectively, among the lateral surfaces of the body, and/or the squeeze sensor 231 may be disposed at a first and a third lateral surface that are not crossed to each other, respectively, among the lateral surfaces of the body.

The squeeze sensor 231 may convert a pressure applied to a specific portion into an electrical input signal. The squeeze sensor 231 may detect (or determine) a size (or amount) of the applied pressure, a pressure applied frequency, a pressure applied time, a pressure applied position, and/or a pressure applied area. The display unit 251 may display an indicator that indicates at least one of a size (or amount) of the applied pressure, a pressure applied frequency, a pressure applied time, a pressure applied position, and/or a pressure applied area.

When a pressure greater than a predetermined value is applied to the squeeze sensor 231, a location of an object displayed on the display unit 251 may change based on a pressure applied position (S120).

More specifically, when a pressure greater than a predetermined value is applied to the squeeze sensor 231 (i.e., in case of a squeeze state), the controller 180 may detect (or determine) one of the squeeze sensors to which the pressure is applied. The controller 180 may recognize a pressure applied position based on the detected result.

The controller 180 may then change the location of an object displayed on the display unit 251 based on the pressure applied position.

More specifically, when the display unit 251 includes a plurality of objects, the controller 180 may determine a priority of each of the plurality of objects, and may change the location of the plurality of objects based on priority of the each of the objects and the pressure applied position. For example, based on a use frequency of an object, the object with a high use frequency may be disposed adjacent to the pressure applied position, and the object with a low use frequency may be disposed far away from the pressure applied position.

On the other hand, the controller 180 may determine whether the user's hand (holding the body) is the user's left hand, the user's right hand, or both hands based on the pressure applied position. The controller 180 may change the location of an object displayed on the display unit 251 based on the determined result.

Referring to FIG. 5, the squeeze sensor 231 may sense a pressure greater than a predetermined value (S210). When a pressure greater than a predetermined value is applied to the squeeze sensor 131, the touch sensor 232 may adjust sensitivity of the touch sensor 232 to sense a touch input applied to a lateral surface of the body (S220).

More specifically, when a pressure greater than a predetermined value is applied to the squeeze sensor 231 (i.e., in case of a squeeze state), the controller 180 may generate a control command for adjusting sensitivity of the touch sensor 232. Accordingly, the controller 180 may increase sensitivity of the touch sensor 232 to allow the touch sensor 232 to sense even a touch input applied to the lateral surface of the body in addition to the front surface of the body. The display unit 251 may display an indicator indicating a sensitivity of a touch sensor. On the other hand, the touch sensor 232 may sense a stylus pen even if the display unit 251 is separated from the stylus pen by a predetermined distance.

The controller 180 may restore the sensitivity of the touch sensor 232 when a predetermined time has passed after a pressure greater than a predetermined value is applied to the squeeze sensor 231. The controller 180 may restore the sensitivity of the touch sensor 232 when the pressure greater than a predetermined value is applied again.

When a touch input is sensed at a lateral surface of the body, a location of an object displayed on the display unit 251 may be changed based on a position at which the touch input is sensed (S230).

More specifically, when the display unit 251 includes a plurality of objects, the controller 180 may determine a priority of each of the plurality of objects, and the controller 180 may change the location of the plurality of objects based on priority of the each of the objects and the position at which the touch input is sensed. For example, based on a use frequency of an object, the object with a high use frequency may be disposed adjacent to the position at which the touch input is sensed, and the object with a low use frequency may be disposed far away from the position at which the touch input is sensed.

On the other hand, the controller 180 may determine whether the user's hand (holding the body) is the user's left hand, the user's right hand, or both hands based on the position at which the touch input is sensed. The controller 180 may change the location of an object displayed on the display unit 251 based on the determined result.

As described above, the location of the user's finger may be sensed by the squeeze sensor 231 and the location of objects displayed on the display unit 251 may change according to the location of the finger, thereby allowing the user to conveniently touch objects. Accordingly, the user may control the mobile terminal 100 even with only one hand.

Further, a pressure applied to the squeeze sensor 231 and a pressure applied to the touch sensor 232 may be distinguished from each other, thereby reducing the user's input error. As a result, a user's convenience may be enhanced.

Figure 7:
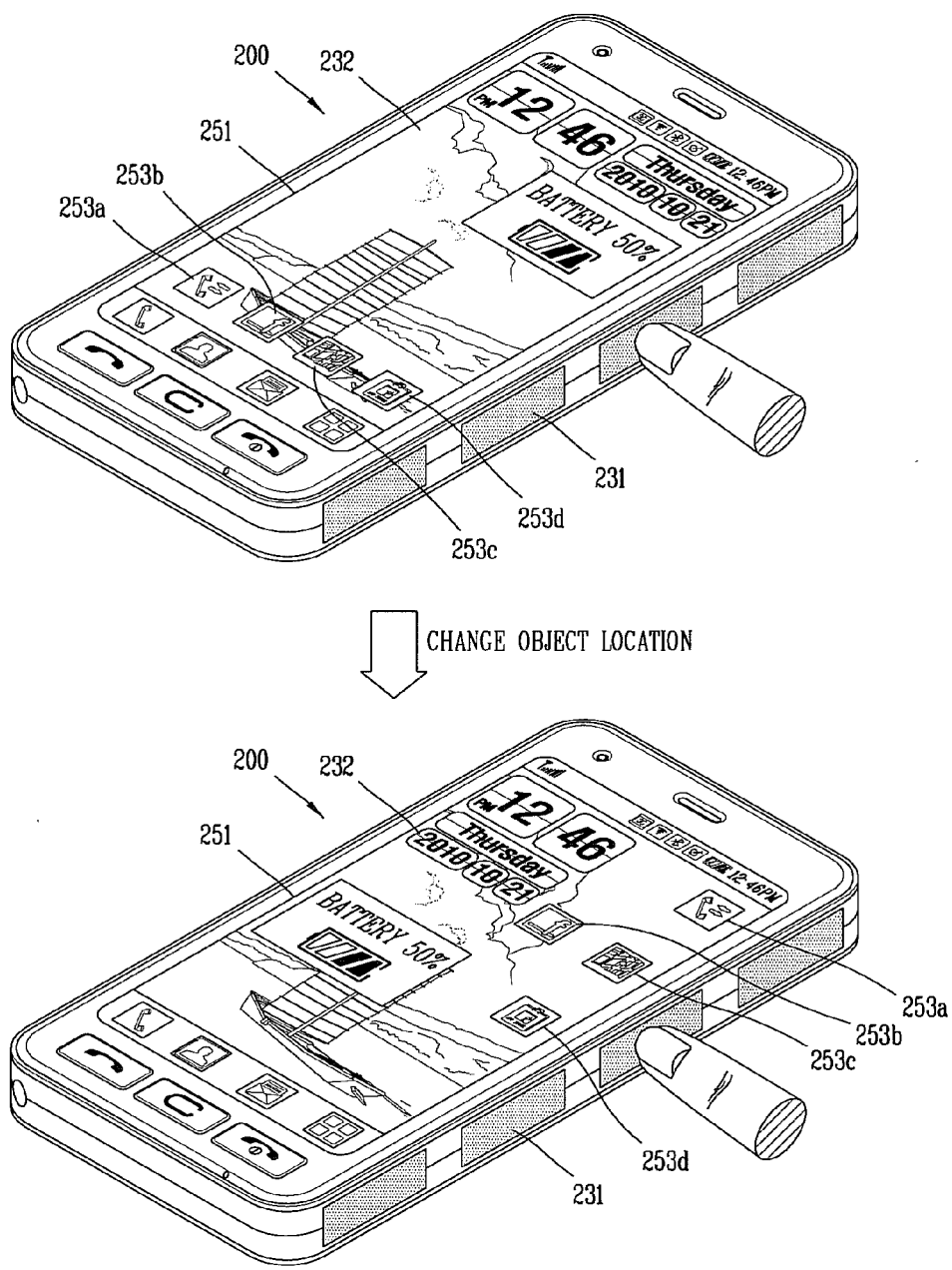

FIGS. 6 and 7 are views illustrating an operation example of the mobile terminal 200. FIG. 6 shows that the mobile terminal 200 may include the display unit 251, the squeeze sensor 231, the touch sensor 232, and the controller 180. Other embodiments and views may also be provided.

The display unit 251 may display a dock screen 252, and the dock screen 252 may include a plurality of objects.

When a pressure greater than a predetermined value is applied to the squeeze sensor 231, the controller 180 may recognize (or determine) a pressure applied position by detecting one of the plurality of squeeze sensors to which the pressure is applied. The controller 180 may then change the location of a plurality of objects contained in the dock screen 252. Accordingly, the plurality of objects contained in the dock screen 252 may be displayed in a region of the display unit 251 that is adjacent to the pressure applied position.

As another example, when a pressure greater than a predetermined value is applied to the squeeze sensor 231, the controller 180 may increase a sensitivity of the touch sensor 232 to allow the touch sensor 232 to sense even a touch input applied to a lateral surface of the body in addition to a front surface of the body (or housing). The controller 180 may then change a location of the plurality of objects contained in the dock screen 252 based on a position at which a touch input is sensed. Accordingly, the plurality of objects contained in the dock screen 252 may be displayed in a region of the display unit 251 that is adjacent to the position at which a touch input is sensed.

Referring to FIG. 7, the display unit 251 may display a plurality of objects. The object may be one of an icon, a widget, a thumbnail image and/or an application execution menu.

As one example, when a pressure greater than a predetermined value is applied to the squeeze sensor 231, the controller 180 may recognize (or determine) a pressure applied position by detecting one of the plurality of squeeze sensors to which a pressure is applied. The controller 180 may then change the location of a plurality of objects based on the pressure applied position. The controller 180 may determine a priority of each of the plurality of objects, and change the location of a plurality of objects based on the priority of each of the objects.

As another example, when a pressure greater than a predetermined value is applied to the squeeze sensor 231, the controller 180 may increase a sensitivity of the touch sensor 232. The controller 180 may then change the location of a plurality of objects based on a position at which a touch input is sensed. The controller 180 may determine priority of each of the plurality of objects, and change the location of a plurality of objects based on the priority of each of the objects.

Figure 8:
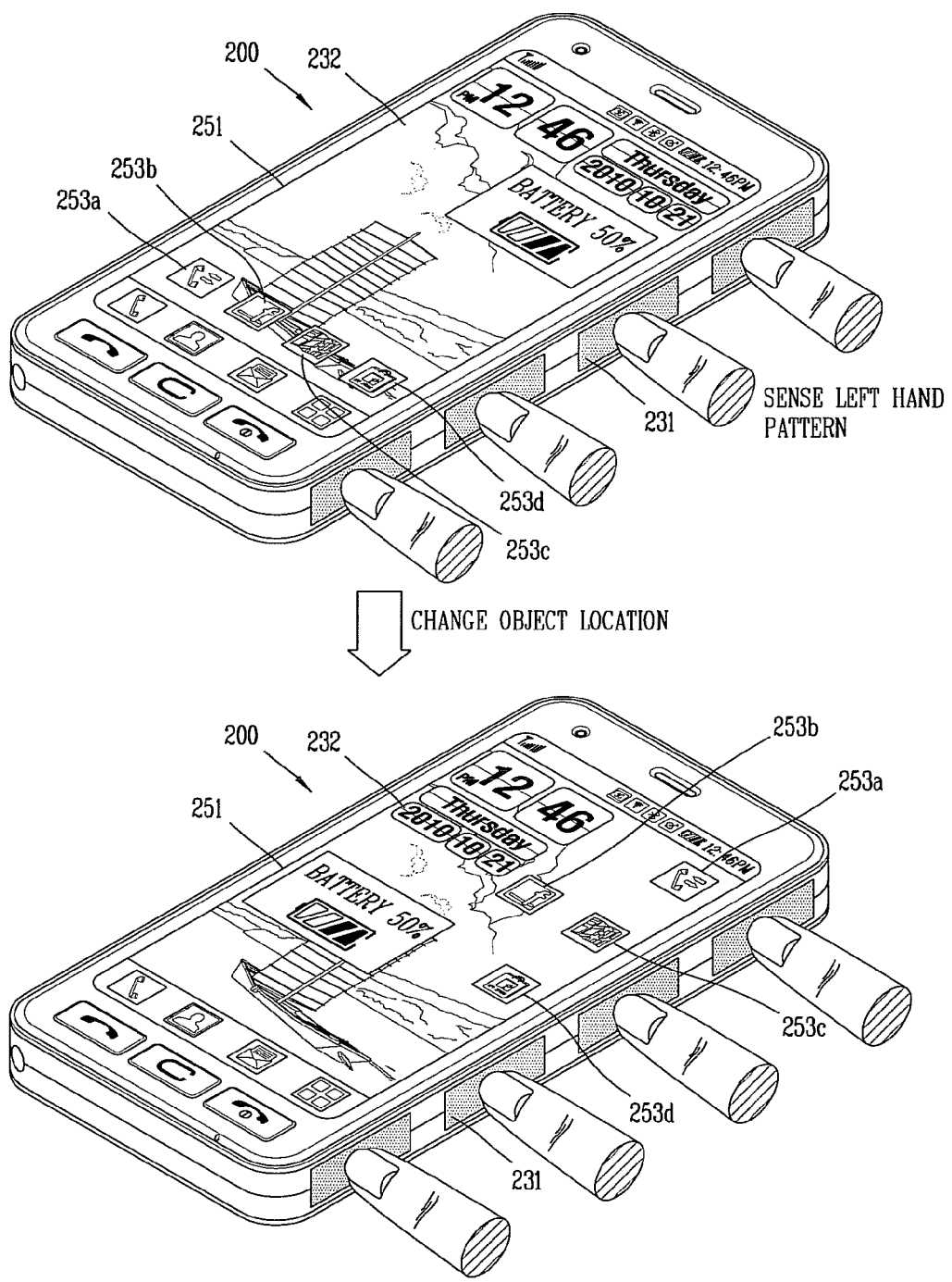
Figure 9:
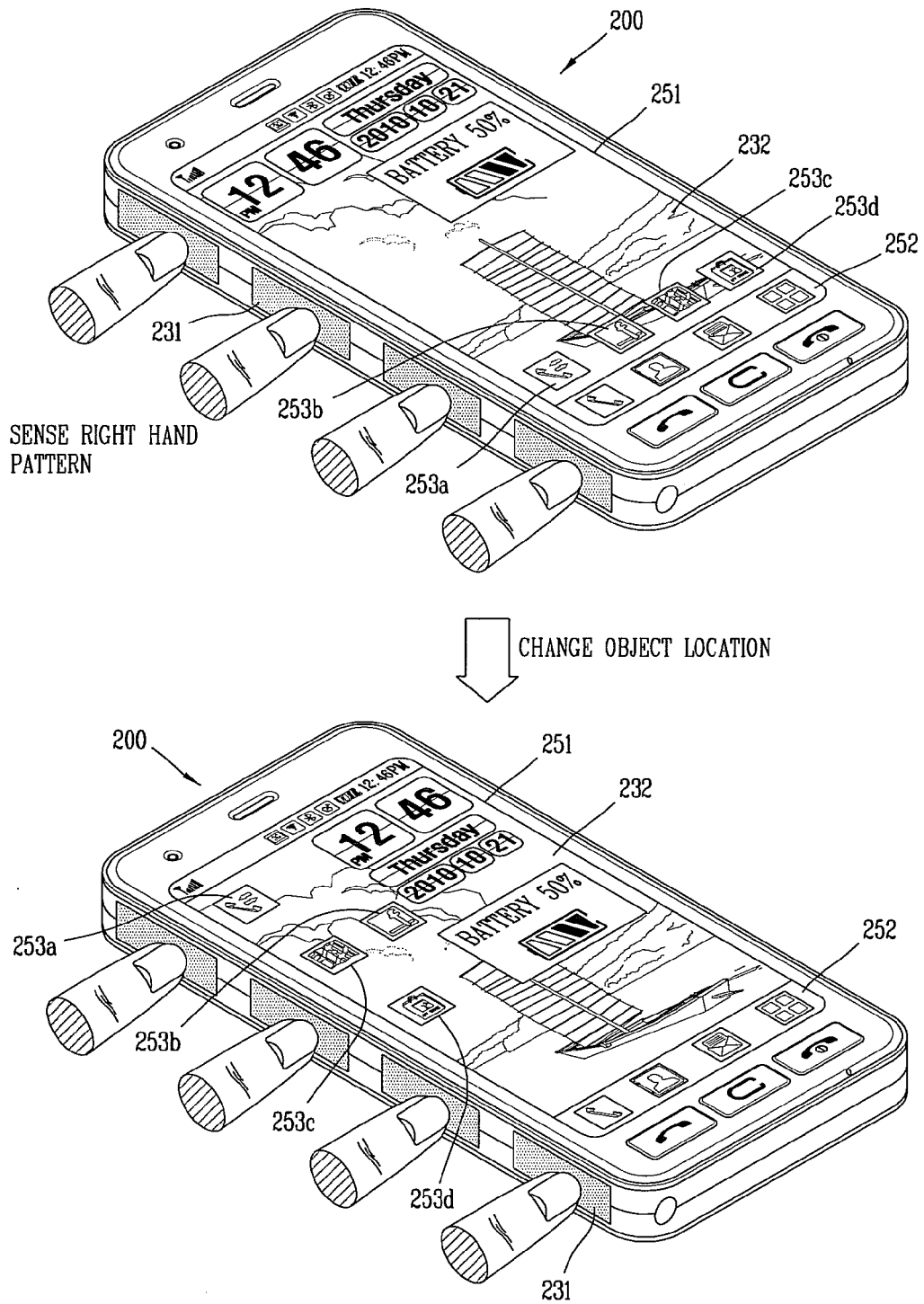

FIGS. 8 and 9 are views illustrating an operation of the mobile terminal. FIG. 8 shows that the mobile terminal 200 may include the display unit 251, the squeeze sensor 231, the touch sensor 232, and the controller 180. Other embodiments and views may also be provided.

The display unit 251 may display a plurality of objects.

According to an example embodiment, when a pressure greater than a predetermined value is applied to the squeeze sensor 231, the controller 180 may recognize that the user's hand (holding the body) is the user's left hand based on a pressure applied position, as shown in FIG. 8. The controller 180 may then change the location of a plurality of objects based on the pressure applied position. Accordingly, the user may easily control objects displayed on the display unit 251 with the user's left hand holding the body.

The controller 180 may recognize (or determine) that the user's hand (holding the body) is the user's right hand, and the controller 180 may change a location of a plurality of objects based on a pressure applied position, as shown in FIG. 9. Accordingly, the user may easily control objects displayed on the display unit 251 with the user's right hand holding the body.

As another example, when a pressure greater than a predetermined value is applied to the squeeze sensor 231, as shown in FIG. 8, the controller 180 may increase a sensitivity of the touch sensor 232 to allow the touch sensor 232 to sense even a touch input applied to a lateral surface of the body in addition to a front surface of the body. The controller 180 may then recognize (or determine) that the user's hand (holding the body) is the user's left hand based on a position at which a touch input is sensed. The controller 180 may then change the location of a plurality of objects based on the position at which a touch input is sensed. Accordingly, the user may easily control objects displayed on the display unit 251 with the user's left hand holding the body.

As shown in FIG. 9, the controller 180 may recognize (or determine) that the user's hand (holding the body) is the user's right hand, and the controller 180 may change the location of a plurality of objects based on a position at which a touch input is sensed. Accordingly, the user may easily control objects displayed on the display unit 251 with the user's right hand holding the body.

Figure 10:
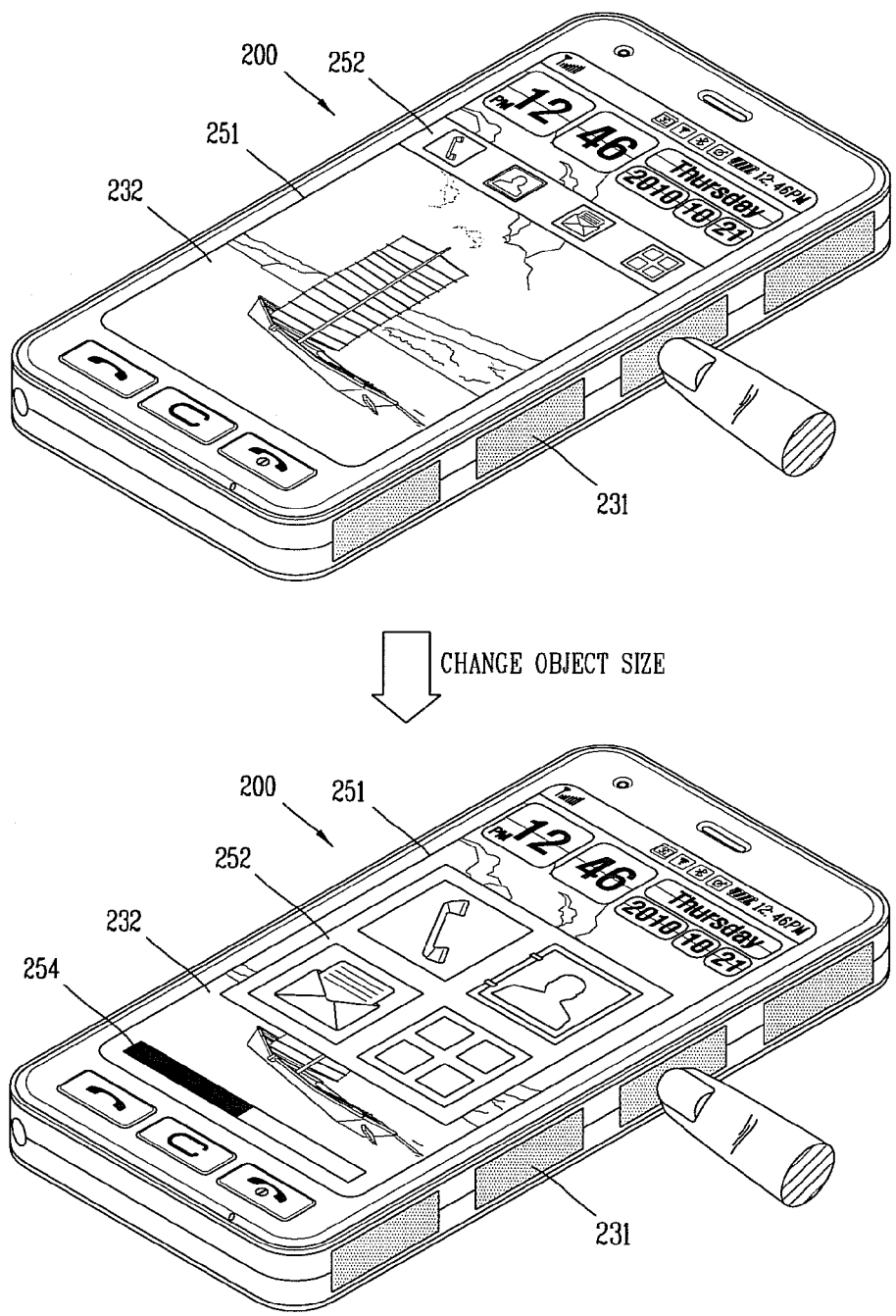

FIG. 10 is a view illustrating an operation of the mobile terminal 200. The mobile terminal 200 may include the display unit 251, the squeeze sensor 231, the touch sensor 232, and the controller 180. Other embodiments and views may also be provided.

As shown in FIG. 10, the display unit 251 may display a dock screen 252, and the dock screen 252 may include a plurality of objects. When a pressure greater than a predetermined value is applied to the squeeze sensor 231, the controller 180 may generate different control commands based on a pattern of the applied pressure. The pattern of the applied pressure may include at least one of a size of the applied pressure, a pressure applied frequency, a pressure applied time, a pressure applied position, and/or a pressure applied area.

For example, when a pressure greater than a predetermined value is applied to the squeeze sensor 231, the controller 180 may increase a size of objects displayed on the display unit 251. As shown in FIG. 10, the controller 180 may display, on the display unit 251, a progress bar 254 indicating a size of the applied pressure, or a pressure applied frequency.

On the other hand, the controller 180 may reduce the size of objects displayed on the display unit 251 based on a pattern of the applied pressure.

Figure 11:
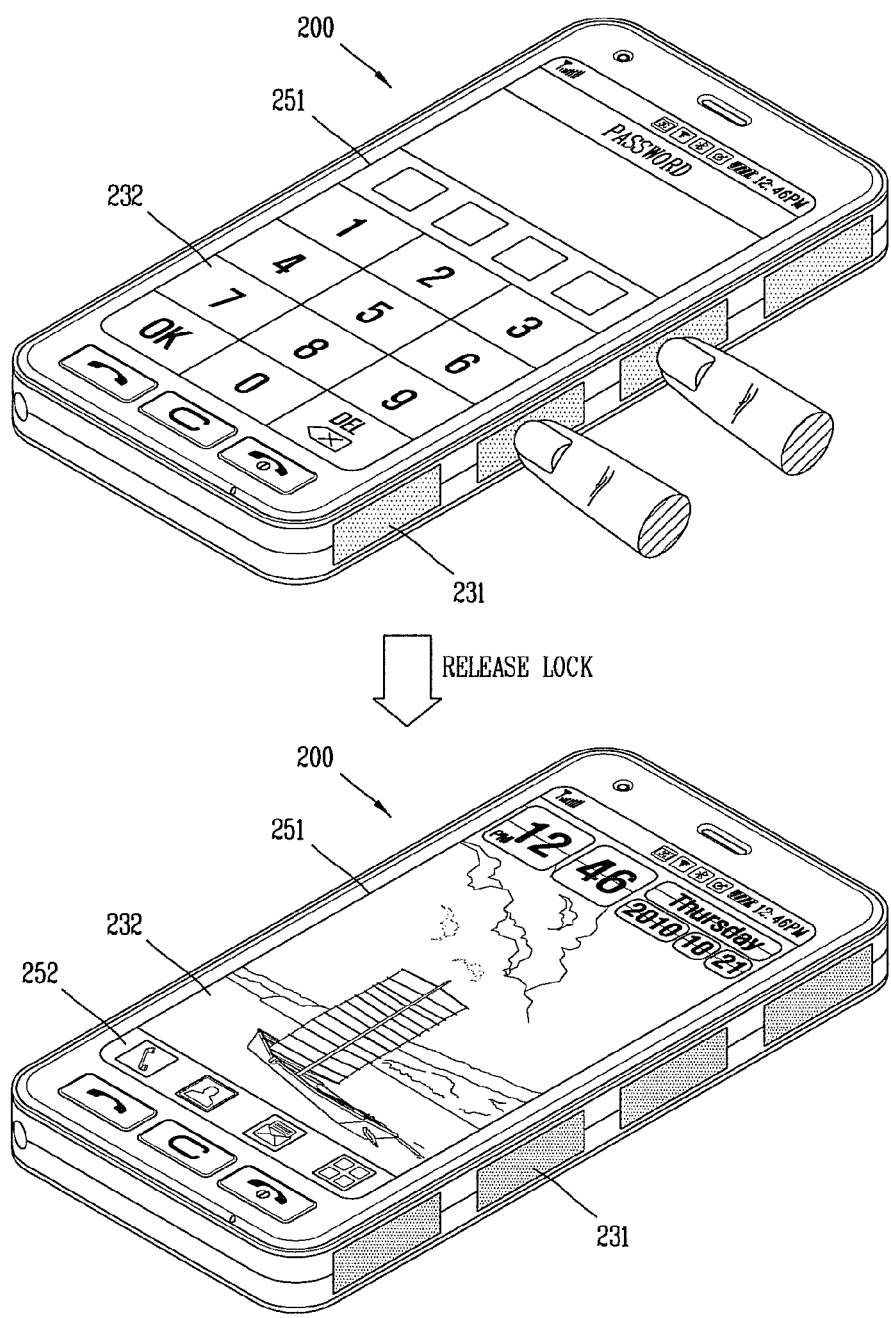

FIG. 11 is a view illustrating an operation of the mobile terminal 200. The mobile terminal 200 may include display unit 251, the squeeze sensor 231, the touch sensor 232, and the controller 180. Other embodiments and views may also be provided.

The display unit 251 may display a lock screen in a lock state that restricts an input of a control command to an application.

According to an example embodiment, when a pressure greater than a predetermined value is applied to the squeeze sensor 231, the controller 180 may recognize (or determine)

a pattern of the applied pressure based on a pressure applied position. The controller 180 may then release the lock state when the pattern of the applied pressure corresponds to a predetermined pattern. The display unit 251 may display a home screen while releasing the lock state.

As another example, when a pressure greater than a predetermined value is applied to the squeeze sensor 231, the controller 180 may increase a sensitivity of the touch sensor 232 to allow the touch sensor 232 to sense even a touch input applied to a lateral surface of the body in addition to a front surface of the body. The controller 180 may then release the lock state when the pattern of the applied pressure corresponds to a predetermined pattern based on a position at which a touch input is sensed.

Figure 12:
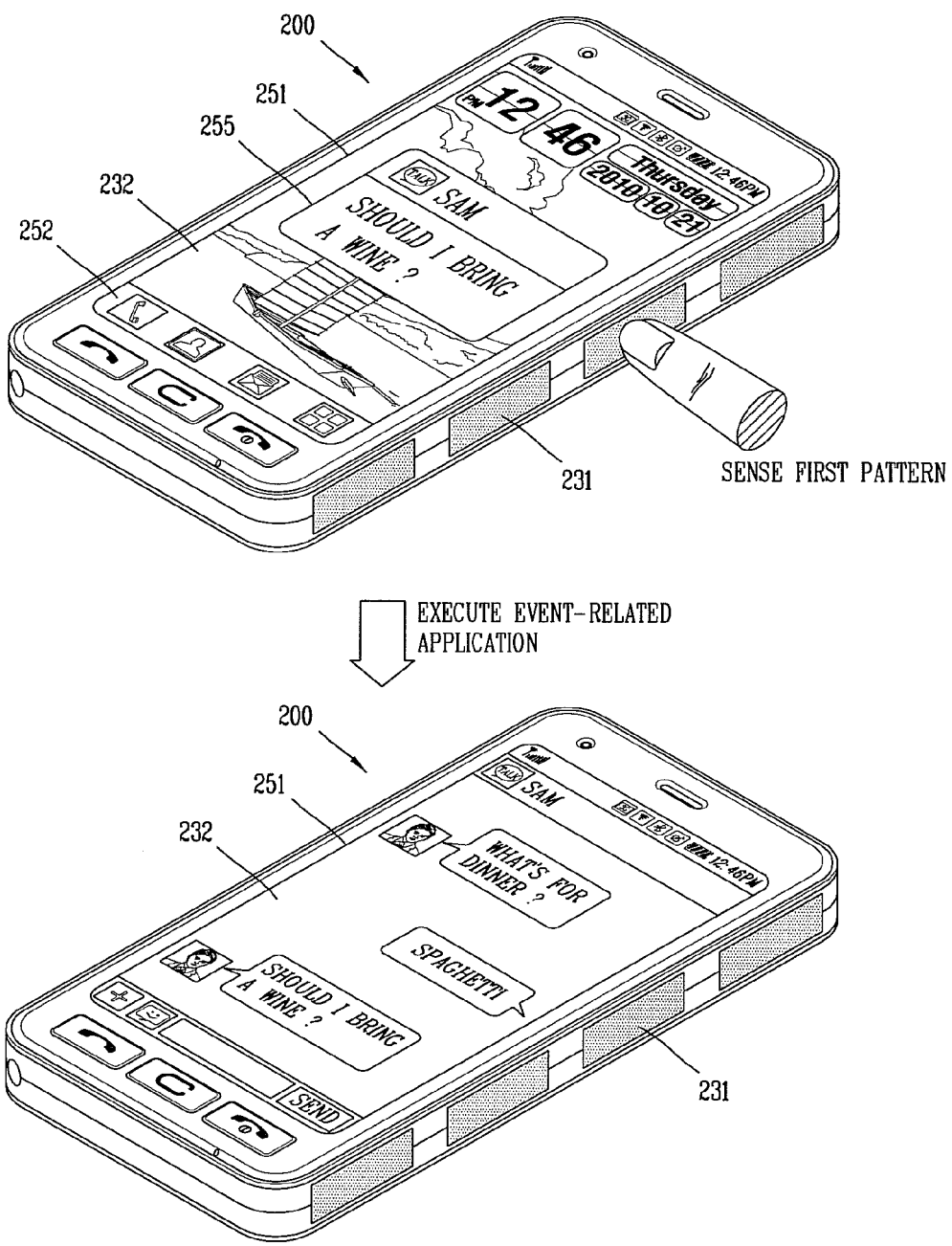
Figure 13:
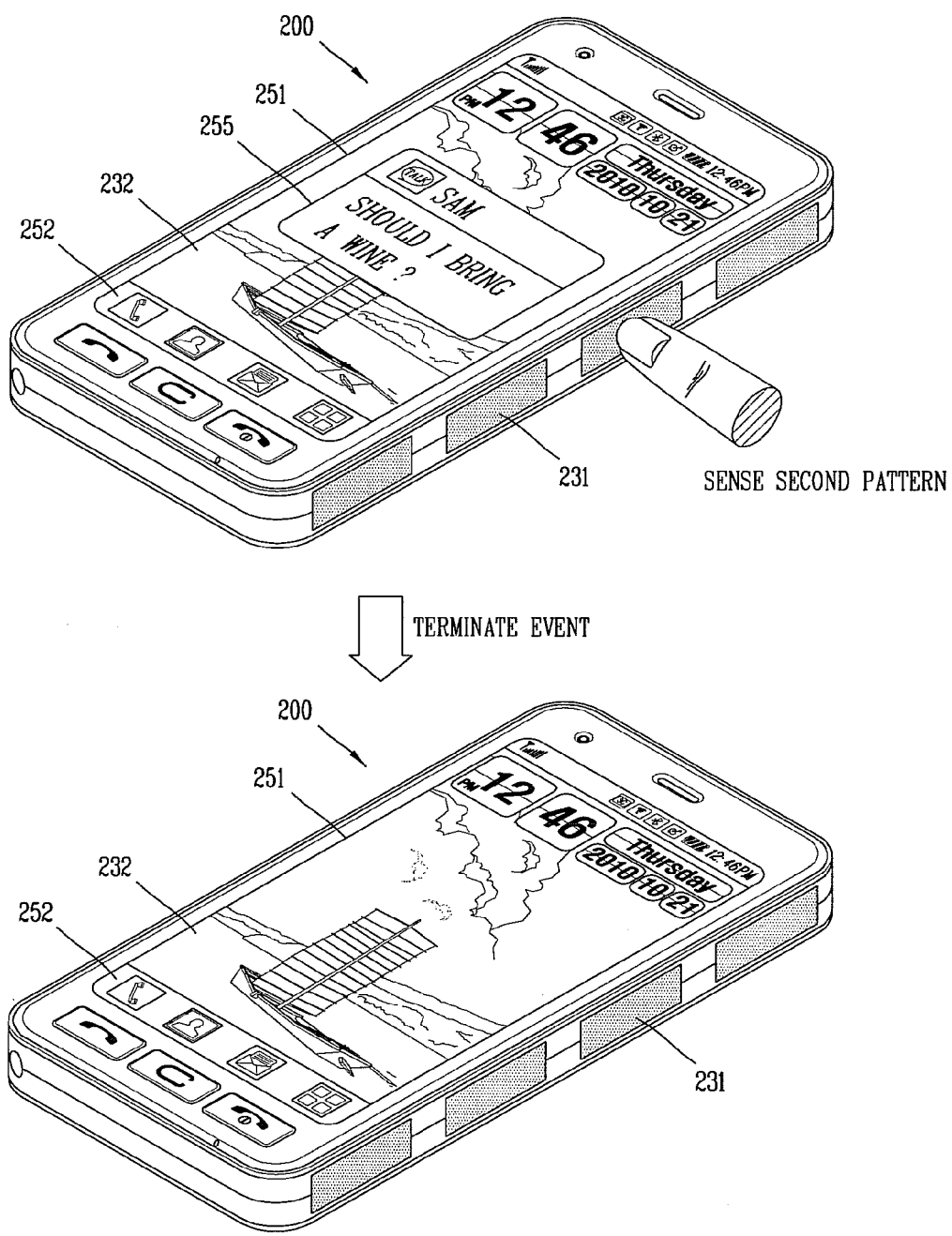

FIGS. 12 and 13 are views illustrating an operation of the mobile terminal. The mobile terminal 200 may include the display unit 251, the squeeze sensor 231, the touch sensor 232, and the controller 180. Other embodiments and views may also be provided.

Referring to FIGS. 12 and 13, when an event occurs, the controller 180 may generate a control command associated with the event based on a pattern of the pressure applied to the squeeze sensor 231.

For example, as shown in FIG. 12, when an event associated with receiving a text message, a popup window 255 containing the received text message may be displayed on the display unit 251. When a pressure is applied to the squeeze sensor 231 as a first pattern, the controller 180 may generate a control command corresponding to the first pattern. The controller 180 may then execute an application associated with the event. Accordingly, the controller 180 may execute a text message application and display an execution screen on the display unit 251.

Further, as shown in FIG. 13, when a pressure is applied to the squeeze sensor 231 as a second pattern, the controller 180 may generate a control command corresponding to the second pattern. The controller 180 may then terminate the event. Accordingly, the controller 180 may terminate the text message application, and allow the popup window 255 that has been displayed on the display unit 251 to disappear.

As another example, when a pressure is applied to the squeeze sensor 231 in a state that the popup window 255 containing the received text message is displayed on the display unit 251, the controller 180 may increase a sensitivity of the touch sensor 232 to allow the touch sensor 232 to sense even a touch input applied to a lateral surface of the body in addition to a front surface of the body. The controller 180 may then execute an application associated with the event or terminate the event based on a pattern of the touch input.

Figure 14:
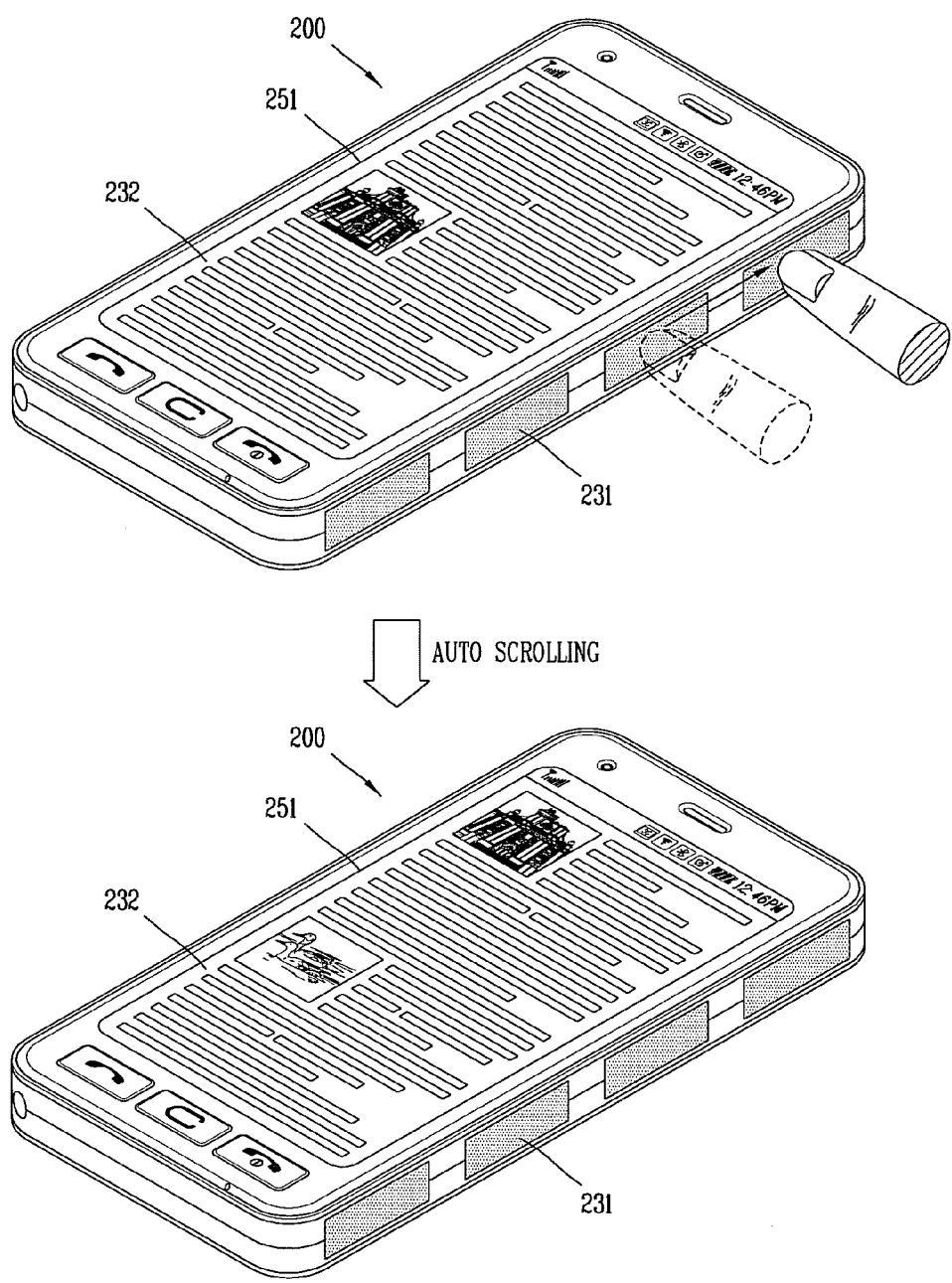

FIGS. 14 and 15 are views illustrating an operation of the mobile terminal. The mobile terminal 200 may include the display unit 251, the squeeze sensor 231, the touch sensor 232, and the controller 180. Other embodiments and views may also be provided.

Referring to FIGS. 14 and 15, the display unit 251 may display first screen information. The controller 180 may change the first screen information to second screen information based on a pattern of the applied pressure.

For example, as shown in FIG. 14, when a pressure is applied to the squeeze sensor 231 as a first pattern in a state that first screen information is displayed on the display unit 251, the controller 180 may generate a control command corresponding to the first pattern. In other words, the controller 180 may perform auto scrolling to display the first screen information and second screen information contained in the same page are displayed on the display unit 251. Accordingly, the display unit 251 can display the second screen information by auto scrolling.

As shown in FIG. 15, when a pressure is applied to the squeeze sensor 231 as a second pattern, the controller 180 may generate a control command corresponding to the second pattern. The controller 180 may perform an operation of turning over a page to display, on the display unit 251, the first screen information and the second screen information contained in another page.

As another example, when a pressure is applied to the squeeze sensor 231 in a state that the first screen information is displayed on the display unit 251, the controller 180 may increase a sensitivity of the touch sensor 232 to allow the touch sensor 232 to sense even a touch input applied to a lateral surface of the body in addition to a front surface of the body. The controller 180 may then perform auto scrolling or display a next page on the display unit 251 based on a pattern of the touch input.

FIG. 16 is a view illustrating an operation of the mobile terminal 200. The mobile terminal 200 may include the display unit 251, the squeeze sensor 231, the touch sensor 232, and the controller 180. Other embodiments and views may also be provided.

Referring to FIG. 16, the content output unit may output a content. The controller 180 may change the output content to another content or adjust a volume level of the output audio based on the pattern of a pressure applied to the squeeze sensor 231.

For example, as shown in FIG. 16, when a pressure greater than a predetermined value is applied to the squeeze sensor 231 in a state that the content output unit outputs a content, the controller 180 may generate a control command based on a pattern of the applied pressure. In other words, the controller 180 may change the output content to another content. The controller 180 may adjust a volume level of the output audio or change a channel of the output image based on a pattern of the applied pressure.

Further, the controller 180 may further transmit a call signal to a preset counterpart based on a pattern of the applied pressure. Accordingly, the user may transmit a call signal to a frequently contacted counterpart in a more convenient manner, and may also transmit a call signal at a higher speed in an emergency state.

As another example, when a pressure is applied to the squeeze sensor 231 in a state that the content output unit outputs a content, the controller 180 may increase a sensitivity of the touch sensor 232 to allow the touch sensor 232 to sense even a touch input applied to a lateral surface of the body in addition to a front surface of the body. The controller 180 may then change the output content to another content or adjust the volume level of the output content based on a pattern of the touch input.

An objective may be to provide a mobile terminal and control method thereof capable of generating an input signal using various devices.

A mobile terminal may include a main body or housing (having a front surface, a rear surface and a lateral surface); a display unit disposed at a front surface of the body, and formed to display an object; and a squeeze sensor (unit) disposed at a lateral surface of the body to sense a pressure above a predetermined value being applied thereto. A controller may be configured to change a location of an object displayed on the display unit based on a pressure applied position when the pressure above a predetermined value (or activation pressure) is applied to the squeeze sensor (unit).

The squeeze sensor (unit) may include at least one squeeze sensor disposed at a lateral surface of the body. The controller may detect one of the at least one squeeze sensor to which a pressure is applied, and the controller may recognize the pressure applied position according to the detected result when the pressure above a predetermined value is applied to the squeeze sensor (unit).

The controller may determine whether the user's hand (holding the body) is his or her left hand, right hand, or both hands based on the pressure applied position. The controller may change the location of an object displayed on the display unit based on the determined result.

The display unit may be formed to display a plurality of objects. The controller may determine a priority of each of the plurality of objects. The controller may change the location of the plurality of objects based on the priority of each of the objects and the pressure applied position.

The controller may generate different control commands based on a pattern of the applied pressure when the pressure greater than a predetermined value is applied to the squeeze sensor unit. The pattern of the applied pressure may include at least one of a size of the applied pressure, a pressure applied frequency, a pressure applied time, a pressure applied position, and/or a pressure applied area.

The display unit may be formed to display a lock screen in a lock state that restricts an input of a control command to an application. The controller may release the lock state when the pattern of the applied pressure corresponds to a predetermined pattern in a state that the lock screen is displayed.

When an event occurs, the controller may execute an application associated with the event or terminate the event based on the pattern of the applied pressure.

The display unit may be formed to display first screen information. The controller may change the first screen information to second screen information based on the pattern of the applied pressure in a state that the first screen information is displayed.

The first and the second screen information may be contained in one page or contained in different first and second pages, respectively. The controller may change the first screen information to the second screen information by an auto scrolling to the page when the first and the second screen information are contained in one page.

The mobile terminal may further include a content output unit configured to output a content. The controller may change the output content to another content or adjust a volume level of the output audio based on the pattern of the applied pressure.

The controller may display an indicator indicating at least one of a size of the applied pressure, a pressure applied frequency, a pressure applied time, a pressure applied position, and/or a pressure applied area, being applied to the squeeze sensor unit.

A mobile terminal may include a main body or housing) (having a front surface, a rear surface and a lateral surface); a display unit disposed at a front surface of the body, and formed to display an object; and a touch sensor (unit) disposed at a front surface of the display unit to sense a touch input. A squeeze sensor (unit) may be disposed at a lateral surface of the body to sense a pressure above a predetermined value (or activation pressure) being applied thereto. A controller may be configured to adjust a sensitivity of the touch sensor (unit) such that the touch sensor (unit) can sense a touch input applied to a lateral surface of the body when the pressure above a predetermined value is applied to the squeeze sensor (unit), and the controller may change the location of an object displayed on the display unit based on a position at which the touch input is sensed when the touch input is sensed at a lateral surface of the body.

The controller may restore a sensitivity of the touch sensor unit when a predetermined time has passed after the pressure above a predetermined value is applied to the squeeze sensor (unit) or the pressure above a predetermined value is applied again.

The controller may determine whether the user's hand (holding the body) is his or her left hand, right hand, or both hands based on a position at which the touch input is sensed at a lateral surface of the body, and the controller may change the location of an object displayed on the display unit based on the determined result.

The display unit may be formed to display a plurality of objects. The controller may determine the priority of each of the plurality of objects, and may change the location of the plurality of objects based on the priority of the each of the objects and the position at which the touch input is sensed at a lateral surface of the body.

The display unit may be formed to display a lock screen in a lock state that restricts an input of a control command to an application. The controller may release the lock state when the pattern of the touch input sensed at a lateral surface of the body corresponds to a predetermined pattern in a state that the lock screen is displayed.

When an event occurs, the controller may execute an application associated with the event or terminate the event based on the pattern of the touch input sensed at a lateral surface of the body.

The display unit may be formed to display first screen information. The controller may change the first screen information to second screen information based on the pattern of the touch input sensed at a lateral surface of the body in a state that the first screen information is displayed.

The first and the second screen information may be contained in one page or contained in different first and second pages, respectively. The controller may change the first screen information to the second screen information by an auto scrolling to the page when the first and the second screen information are contained in one page.

The mobile terminal may further include a content output unit configured to output a content. The controller may change the output content to another content or adjust a volume level of the output audio based on the pattern of the touch input sensed at a lateral surface of the body.

The controller may display an indicator indicating sensitivity of the touch sensor (unit) on the display unit.

A control method of a mobile terminal may include allowing a squeeze sensor (unit) disposed at a lateral surface of the body to sense a pressure above a predetermined value being applied thereto; and changing the location of an object displayed on the display unit based on a pressure applied position when the pressure above a predetermined value is applied to the squeeze sensor (unit).

A control method of a mobile terminal may also include allowing a squeeze sensor (unit) disposed at a lateral surface of the body to sense a pressure above a predetermined value being applied thereto; adjusting a sensitivity of the touch sensor (unit) such that the touch sensor (unit) can sense a touch input applied to a lateral surface of the body when the pressure above a predetermined value is applied to the squeeze sensor (unit); and changing a location of an object displayed on the display unit based on a position at which the touch input is sensed when the touch input is sensed at a lateral surface of the body.

Embodiments of the foregoing method may be implemented as codes readable by a processor on a medium written by a program. Examples of the processor-readable media may include ROM, RAM, CD-ROM, magnetic tape, floppy disk, and optical data storage device, and the like, and may also include a device implemented in a form of a carrier wave (for example, transmission via the Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a body having a front surface, a rear surface and a lateral surface;
   a display mounted at the front surface of the body;
   a sensor configured to receive a touch input applied to the lateral surface of the body; and
   a controller configured to:
      control the display to display a first screen corresponding to a lock state;
      receive a plurality of touch inputs applied to the lateral surface in a state in which the first screen is displayed on the display, wherein a specific pattern is defined by the plurality of touch inputs applied to different positions on the lateral surface of the body at different times; and
      in response to the specific pattern corresponding to a predetermined pattern,
         convert the lock state to a release state, and
         control the display to display a second screen corresponding to the release state instead of the first screen corresponding to the lock state.

2. The mobile terminal of claim 1, wherein the controller is further configured to:
   control the display to display an object on a display area of the display; and
   change a display position of the object in response to a touch input applied to the lateral surface of the body, wherein the object is displayed, on the display area, on a portion corresponding to a position of the touch input.

3. The mobile terminal of claim 1, wherein the controller determines whether a user's hand is the user's left hand, the user's right hand, or both hands based on a touch input applied to the lateral surface of the body.

4. The mobile terminal of claim 1, wherein the controller is further configured to:
   control the display to display a plurality of objects, and
   change a display position of the plurality of objects based on a portion of a touch input applied to the lateral surface of the body and a priority of each of the plurality of objects.

5. The mobile terminal of claim 4, wherein the priority of each of the plurality of objects is determined based on a use frequency of the plurality of objects.

6. The mobile terminal of claim 1, wherein when an event occurs, the controller executes an application associated with the event or terminates the event based on a pattern of the plurality of touch inputs applied to the lateral surface of the body.

7. The mobile terminal of claim 1, wherein the controller is further configured to:
   control the display to display screen information, and
   scroll the screen information displayed on the display in response to a touch input applied to the lateral surface of the body.

8. The mobile terminal of claim 1, wherein the controller is further configured to:
   control the display to display first screen information, and
   change the first screen information to second screen information different from the first screen information based on a touch input applied to the lateral surface of the body.

9. The mobile terminal of claim 8, wherein the first screen information and the second information are provided in one page, and the controller scrolls the one page in response to the touch input.

10. The mobile terminal of claim 1, further comprising:
    a content output unit to output a content,
    wherein the controller changes the output content to another content or adjusts a volume level of the output content based on a touch input applied to the lateral surface of the body.

11. A method of a mobile terminal that includes a body, a display mounted at a front surface of the body and a sensor configured to receive a touch input applied to a lateral surface of the body, the method comprising:
    displaying, on the display of the mobile terminal, a first screen corresponding to a lock state;
    receiving a plurality of touch inputs applied to the lateral surface in a state in which the first screen is displayed on the display, wherein a specific pattern is defined by the plurality of touch inputs applied to different positions on the lateral surface of the body at different times; and
    in response to the specific pattern corresponding to a predetermined pattern,
       converting the lock state to a release state, and
       displaying, on the display of the mobile terminal, a second screen corresponding to the release state instead of the first screen corresponding to the lock state.

12. The method of claim 11, further comprising:
    displaying, on the display, an object on a display area of the display; and
    changing a display position of the object in response to a touch input applied to the lateral surface of the body, wherein the object is displayed, on the display area, on a portion corresponding to a position of the touch input.

13. The method of claim 11, further comprising:
    determining whether a user's hand is the user's left hand, the user's right hand, or both hands based on a touch input applied to the lateral surface of the body.

14. The method of claim 11, further comprising:
    displaying, on the display, a plurality of objects, and changing a display position of the plurality of objects based on a portion of a touch input applied to the lateral surface of the body and a priority of each of the plurality of objects.

15. The method of claim 14, wherein the priority of each of the plurality of objects is determined based on a use frequency of the plurality of objects.

16. The method of claim 11, wherein when an event occurs, executing an application associated with the event or terminating the event based on a pattern of the plurality of touch inputs applied to the lateral surface of the body.

17. The method of claim 11, further comprising:
displaying, on the display, screen information, and
scrolling the screen information displayed on the display in response to a touch input applied to the lateral surface of the body.

18. The method of claim 11, further comprising:
displaying, on the display, first screen information, and
changing the first screen information to second screen information different from the first screen information based on a touch input applied to the lateral surface of the body.

19. The method of claim 18, wherein the first screen information and the second information are provided in one page, scrolling the one page in response to the touch input.

20. The method of claim 11, further comprising:
outputting a content,
wherein the output content is changed to another content or a volume level of the output content is adjusted based on a touch input applied to the lateral surface of the body.

* * * * *